United States Patent
Devane et al.

(10) Patent No.: US 11,695,786 B2
(45) Date of Patent: Jul. 4, 2023

(54) METHODS AND APPARATUS TO IDENTIFY SUSPICIOUS ELECTRONIC COMMUNICATION BASED ON COMMUNICATION HISTORY

(71) Applicant: McAfee, LLC, Santa Clara, CA (US)

(72) Inventors: Oliver Georges Devane, Buckinghamshire (GB); Deepak Setty, Bangalore (IN)

(73) Assignee: MCAFEE, LLC, San Jose, CA (US)

(*) Notice: Subject to any disclaimer, the term of this patent is extended or adjusted under 35 U.S.C. 154(b) by 313 days.

(21) Appl. No.: 16/889,473

(22) Filed: Jun. 1, 2020

(65) Prior Publication Data
US 2021/0329015 A1 Oct. 21, 2021

(30) Foreign Application Priority Data
Apr. 17, 2020 (IN) .............................. 202011016631

(51) Int. Cl.
*H04L 9/40* (2022.01)
*G06F 16/22* (2019.01)

(52) U.S. Cl.
CPC .......... *H04L 63/1416* (2013.01); *G06F 16/22* (2019.01); *H04L 63/145* (2013.01)

(58) Field of Classification Search
CPC ... H04L 63/1416; H04L 63/145; H04L 51/48; H04L 51/08; H04L 51/18; H04L 51/212; H04L 63/1425; G06F 16/22
See application file for complete search history.

(56) References Cited

U.S. PATENT DOCUMENTS 10,880,322 B1 * 12/2020 Jakobsson ............... H04L 51/08
2017/0078321 A1 * 3/2017 Maylor ................. H04L 63/105
2018/0375877 A1 * 12/2018 Jakobsson ............. G06F 16/955

* cited by examiner

*Primary Examiner* — Jung H Park
(74) *Attorney, Agent, or Firm* — Hanley, Flight & Zimmerman, LLC

(57) ABSTRACT

Example apparatus to process an electronic communication includes a trusted communication identifier including a contact identifier to compare sender information from the electronic communication to contact information from a contact datastore, determine that a communication has not previously been sent from a recipient of the electronic communication to the sender of the electronic communication when the sender information from the electronic communication is not found in the contact datastore, and in response to determining that the communication has not been previously sent, provide an alert message that the sender information from the electronic communication is unknown. The trusted communication identifier further including a user action determiner to store the sender information from the electronic communication in the contact datastore when a response to the electronic communication has been sent.

20 Claims, 9 Drawing Sheets

METHODS AND APPARATUS TO IDENTIFY SUSPICIOUS ELECTRONIC COMMUNICATION BASED ON COMMUNICATION HISTORY

FIELD OF THE DISCLOSURE

This disclosure relates generally to communication systems, and, more particularly, to methods and apparatus to identify suspicious electronic communication based on communication history.

BACKGROUND

Users typically exchange information and correspondence with other users using electronic devices. Users may use a variety of applications (electronic mail (email), text messaging, direct messaging, etc.) on electronic devices to exchange information. The information exchanged among electronic device users may be referred to as electronic communications. Electronic communications may be sent from a user device through a variety of communication protocols (e.g., email, text messaging, social media, etc.), and these communication protocols may have different user accounts associated with them. However, these different user accounts are associated with one user. User devices may determine the sender of an electronic communication based on sender account information included in the electronic communication.

Figure 1:
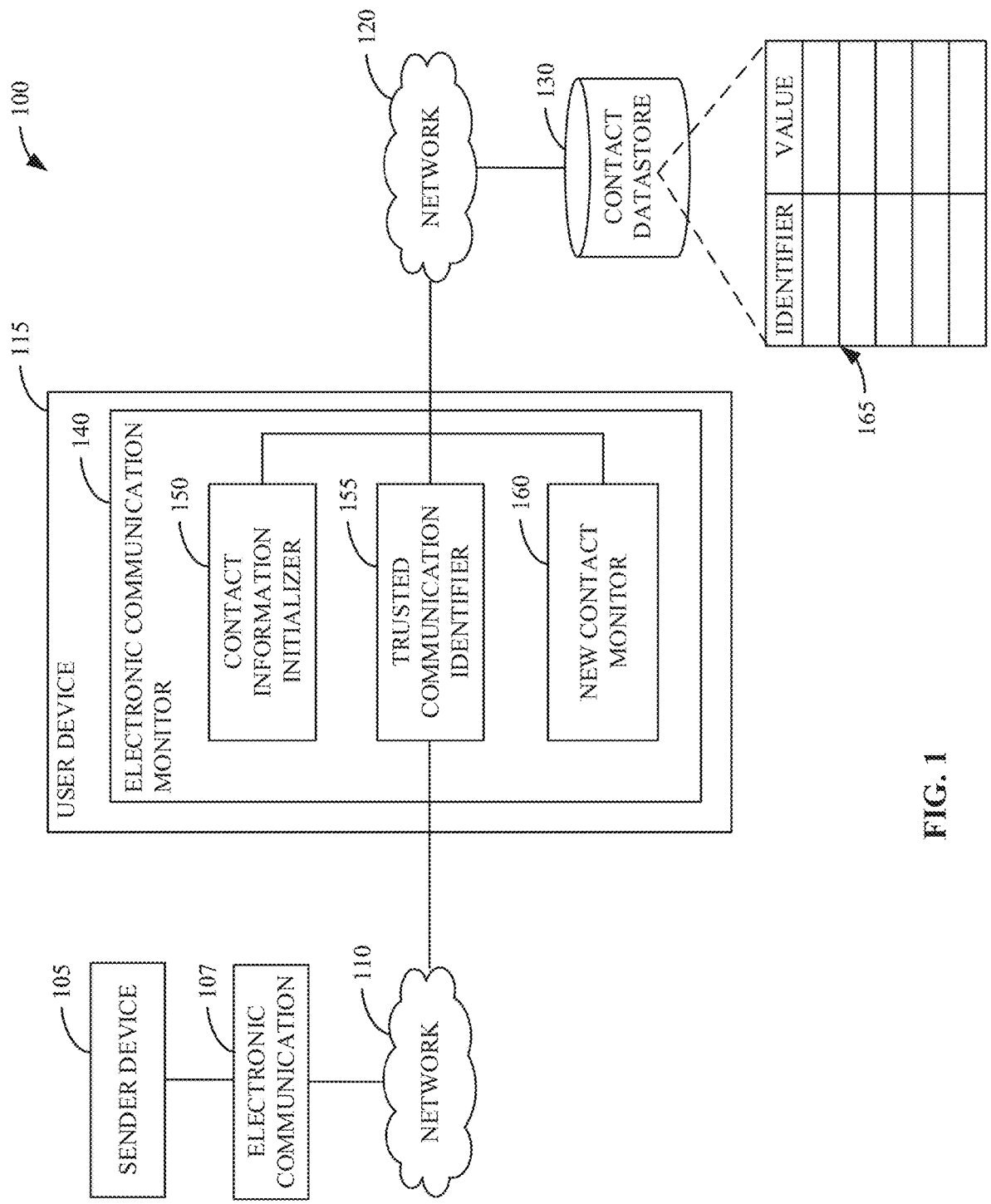
FIG. 1 illustrates an example environment in which electronic communications received by a device are screened to determine if the electronic communications are from unknown contacts in accordance with teachings disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, an electronic communication is a form of communication transmitted between user devices to exchange information from one user to another. In examples disclosed herein, an electronic communication is sent from an application on a user device. In examples disclosed herein, the electronic communication may be email, short message service (SMS) messages, instant messages (e.g., Skype), direct messages on social media (e.g., Twitter, Facebook, Instagram, etc.), etc. In some examples, a user device may also host a browser application (e.g., GOOGLE CHROME™ browser, SAFARI® browser, etc.) which accesses websites that are used in sending electronic communications. For example, a user may log into their email account on an email website (e.g., OUTLOOK® web access, etc.) on a browser application (e.g., GOOGLE CHROME browser, etc.).

In some examples, malicious actors (e.g., "scammers") may contact a target user via these electronic communications. In some prior systems, a user targeted by a scammer is provided with very little information to inform them that the electronic communication is from a malicious actor. As used herein, a malicious communication refers to an electronic communication from a malicious actor.

Prior systems may provide users with a visual alert to notify them of a potential malicious communication. For example, some prior systems alert the user that the electronic communication is a malicious communication when the sender of the communication is not included in a recipient user's address book. However, many user's only keep a limited set of preferred recipients in their address book and, thus, a user's address book may not be an accurate representation of all sender's that the user considers to be trusted senders (e.g., not malicious)

Examples disclosed herein help to inform and better protect users that are potential victims of malicious communications by analyzing information from a communication history of the users. Examples disclosed herein notify users whether or not they have been in previous contact with the account from which the electronic communication has been sent. Examples disclosed herein provide users with visual alerts on the electronic communication as well as auditory alerts that warn the users to be cautious when opening attachments, clicking on links, and/or providing personal identifiable information (PII) data to the account that contacted them when the target user has not previously communicated with the sender of the electronic communication (e.g., the target user has not previously sent an electronic communication to the sender and has not previously replied to an electronic communication from the sender).

Examples disclosed herein help to protect users from replying to or otherwise interacting with a potential malicious communication with PII or account data. Examples disclosed herein alert a user when the user has not previously been in communication with the account of the electronic communication. Examples disclosed herein also protect users from Malware that may be in attachment files and/or uniform recourse locator (URL) included in an electronic communication. Examples disclosed herein scan and monitor any attachments files and/or URLs with a higher level of suspiciousness when they appear in an electronic communication that is from an account that the user has not contacted in the past.

FIG. 1 illustrates an example environment 100 in which electronic communications received by a user device are screened to determine if the electronic communications are from unknown contacts in accordance with teachings of this disclosure. The example environment 100 of FIG. 1 includes an example sender device 105, an example electronic communication 107, an example network 110, an example user device 115, an example network 120, and an example contact datastore 130. The example user device 115 includes the example electronic communication monitor 140. The example electronic communication monitor 140 includes the example contact information initializer 150, the example trusted communication identifier 155, and an example new contact monitor 160. The example contact datastore 130 includes the example data structure 165.

In the illustrated example of FIG. 1, the example sender device 105 is provided to transmit the example electronic communication 107 to the example user device 115. The example sender device 105 is not included in the system of the examples disclosed herein. The example sender device 105 can be used by a malicious actor. The example sender device 105 is determined to be either be suspicious or not suspicious by the example electronic communication monitor 120. In some examples, the example sender device may be malicious or not malicious. The example sender device 105 can be implemented with any device or combinations of devices that are able to connect to the Internet. Such devices may include, for example, a personal computer, a smart phone, a tablet device, etc., or any combination thereof. In some examples, the example user device 115 may host applications used in receiving and sending electronic communications. For example, the example user device 115 may host applications such as, a messaging application, a phone call application, social media applications (e.g., Twitter, Facebook, Instagram, etc.), an email application, a browser application, and/or instant messaging applications (e.g., Skype). However, other applications may additionally and/or alternatively be included on the example user device 115. In some examples, the example sender device 105 sends the example electronic communication 107 using the hosted applications.

In the illustrated example of FIG. 1, the electronic communication 107 is representative of a communication sent from the example sender device 105 to the example user device 115 through the example network 110. The electronic communication 107 can be any form of communication between any devices or combinations of devices that are able to connect to a network, such as the Internet. The electronic communication may be, for example, email, an instant message (e.g., Skype), a short message service (SMS), a direct message on a Social Media website (e.g., Facebook, Instagram, Twitter, etc.), etc., or any combination thereof. The example electronic communication 107 includes contact information of the account associated with the example sender device 105.

The example network 110 of the illustrated example of FIG. 1 provides the example electronic communication 107 to the example user device 115. The example network 110 is implemented as a public network such as, for example, the Internet. However, any other type of networks (e.g., wired/cabled, wireless, mobile cellular, etc.) which may be public or private, and any combination thereof may additionally and/or alternatively be used.

The example user device 115 of the illustrated example of FIG. 1 is provided to receive the example electronic communication 107. The example user device 115 can be implemented with any device or combinations of devices that are able to connect to the Internet. Such devices may include, for example, a personal computer, a smart phone, a tablet device, etc., or any combination thereof. In some examples, the example user device 115 may host applications used in receiving and sending electronic communications. For example, the example user device 115 may host applications such as, a messaging application, a phone call application, social media applications (e.g., Twitter, Facebook, Instagram, etc.), an email application, a browser application, and/or instant messaging applications (e.g., Skype). However, other applications may additionally and/or alternatively be included on the example user device 115. The example user device 115 includes the example electronic communication monitor 140.

The example electronic communication monitor 140 of the illustrated example of FIG. 1 is provided to determine if the contact information associated with the example electronic communication 107 is from an unknown contact. In some examples, the example electronic communication monitor 140 may be implemented as an application downloaded onto the example user device 115. For example, the electronic communication monitor 140 may be a downloadable mobile application that requests user permission to access the other applications on the user device (e.g., the phone call application, the text messaging application, the social media applications, the email application, etc.). Additionally and/or alternatively, the example electronic communication monitor 140 may be a downloadable computer application that requests user permission to access the other applications on the user device (e.g., the instant messaging applications, the email application, etc.). In some examples, the example electronic communication monitor 140 may be implemented as a browser plugin that requests permission to access the website extensions of the user accounts (e.g., the social media websites, the email website, etc.). The electronic communication monitor 140 includes the example contact information initializer 150, the example trusted communication identifier 155, and the example new contact monitor 160.

The example contact information initializer 150 of the illustrated example of FIG. 1 is provided to obtain the communication history and contact information from the applications on the example user device 115. In some examples, the example contact information initializer 150 obtains the communication history and contacts on the example user device 115 only when the example electronic communication monitor 140 is first executed on the example user device 115. In some examples, the example contact information initializer 150 may only obtain the communication history that was utilized in sending electronic communications from the example user device 115. The example contact information initializer 150 stores the contact information from the relevant communication history and the contacts in the address book of the application in the example contact datastore 130 using the example network 120.

Figure 2:
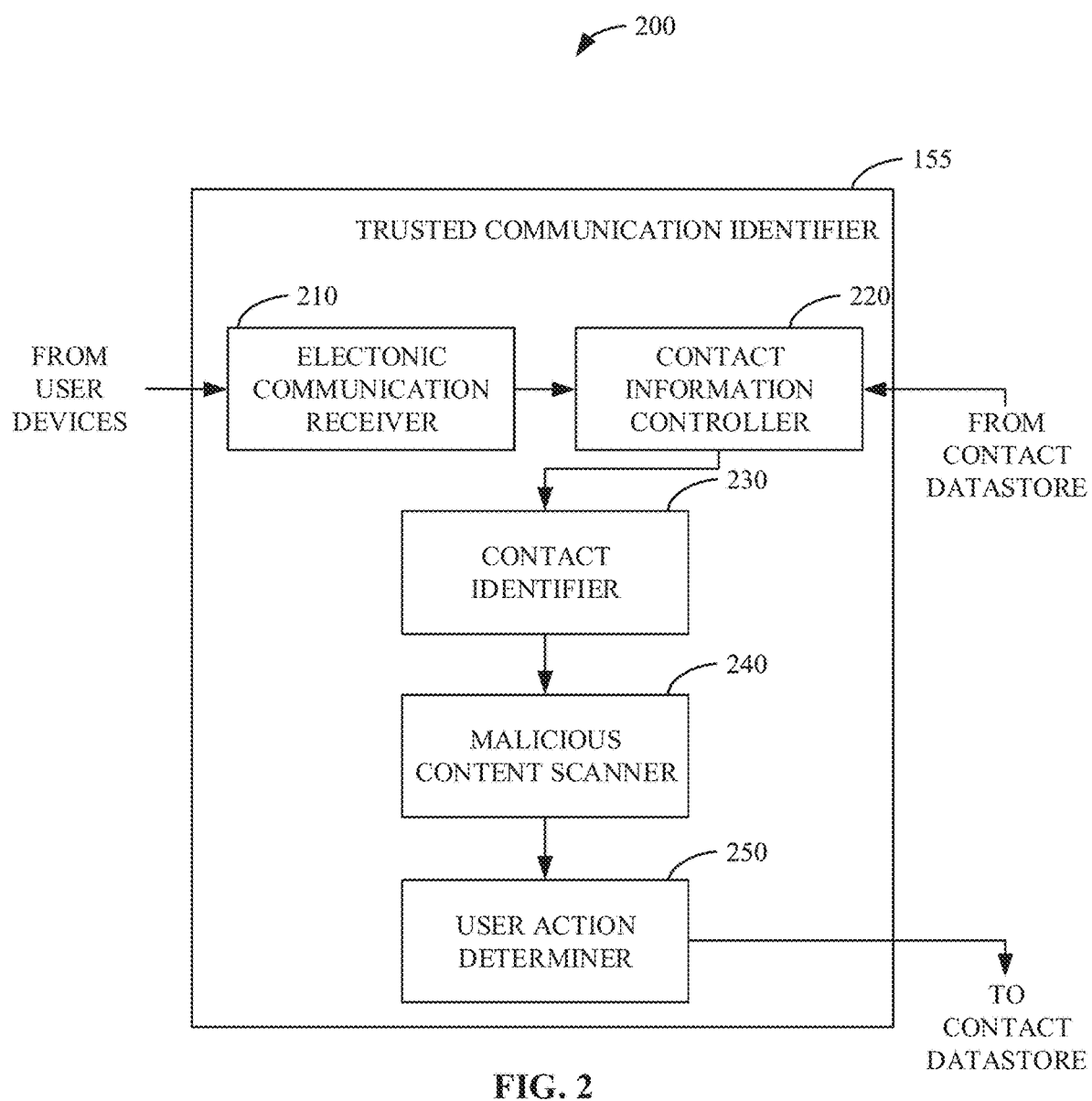
FIG. 2 is a block diagram representative of an example trusted communication identifier of the electronic communication monitor of FIG. 1.

The example trusted communication identifier 155 of the illustrated example of FIG. 1 is provided to determine if the example electronic communication 107 is from a contact that is stored in the example contact datastore 130. In some examples, the example trusted communication identifier 155 determines if there have been previous communications from the example user device 115 to the example sender device 105. An example implementation of the trusted communication identifier 155 is illustrated in FIG. 2, which is described in further detail below.

The example new contact monitor 160 of the illustrated example of FIG. 1 is provided to monitor if any new contacts have been added and/or created in the applications on the example user device 115. In some examples, the example new contact monitor 160 determines if a new contact has been added to the contacts associated with the application on the example user device 115. The example new contact monitor 160 stores the new contact information in the example contact datastore 130 using the example network 120 when the example new contact monitor 160 determines that a new contact has been added to the contacts associated with an application on the example user device 115.

The example network 120 of the illustrated example of FIG. 1 provides the example electronic communication monitor 140 access to the example contact datastore 130. The example network 120 is implemented as a local area network (LAN). However, any other type of network, which may be public or private, may additionally and/or alternatively be used such as, for example, a wide area network (WAN), a wireless local area network (WLAN), a storage area network (SAN), etc. Furthermore, any combination of network types thereof may additionally and/or alternatively be used.

The example contact datastore 130 of the illustrated example of FIG. 1 stores the example data structure 165 which contains information about contacts in the applications of the example user device 115. However, other data may additionally and/or alternatively be stored in the example contact datastore 130. The contact datastore 130 of the illustrated example of FIG. 1 is implemented by any memory, storage device, and/or storage disc for storing data such as, for example, flash memory, magnetic media, optical media, solid state memory, hard drive(s), thumb drive(s), etc. Furthermore, the data stored in the example contact datastore 130 may be in any data format such as, for example, binary data, comma delimited data, tab delimitated data, structured query language (SQL) structures, etc. While the contact datastore 130 is illustrated as a single device in the illustrated example of FIG. 1, the contact datastore 130 and/or any other data storage devices described herein may be implemented by any number and/or type(s) of memories. The example contact datastore 130 is accessible across different user devices. For example, the contact datastore 130 is accessible to a mobile phone application on one user device and a computer application on a different user device. In some examples, the contact datastore 130 is associated with a user account for the example user device 115.

The data structure 165 of the illustrated example of FIG. 1 is provided to store the contact information from the applications on the example user device 115. In some examples, the example data structure 165 includes two columns, however, any number of columns may additionally and/or alternatively be used. In some examples, the first column in the example data structure 165 is the identifier information. In some examples, the identifier information includes the type of electronic communication that the contact information is from. For example, an email electronic communication would have the identifier of "email," a text message electronic communication would have the identifier of "SMS," a phone call electronic communication would have the identifier of "call," and a social media electronic communication would have the identifier of the social media platform (e.g., "Twitter," "Facebook," "Instagram," etc.). However, other identifiers may additionally and/or alternatively be used.

In some examples, the second column in the example data structure 165 is the value information. In some examples, the value information includes the contact information of the account and/or number the electronic communication is from. For example, an email electronic communication would have the value of the email address (e.g., "firstname.lastname@gmail.com"), a text message electronic communication would have the value of the phone number (e.g.,"1234567890"), a phone call electronic communication would have the value of the phone number (e.g.,"1234567890"), and a social media electronic communication would have the value of the username for the social media platform (e.g., "firstname_lastname"). However, other values may additionally and/or alternatively be stored in the example data structure 165. The example data structure 165 is implemented in a data file stored in the example contact datastore 130. The example data structure 165 can be implemented as any data file such as, for example, a JavaScript Object Notation (JSON) file, a text file, or any other data file type.

FIG. 2 is a block diagram representative of the example trusted communication identifier 155 of FIG. 1. The example trusted communication identifier 155 of FIG. 2 includes an example electronic communication receiver 210, an example contact information controller 220, an example contact identifier 230, an example malicious content scanner 240, and an example user action determiner 250.

The example electronic communication receiver 210 of the illustrated example of FIG. 2 is provided to receive the example electronic communication 107 received by the example user device 115 from the example network 110. In some examples, the example electronic communication receiver 210 accesses the example electronic communication 107 as well as the contact information of the example sender device 105 associated with the example electronic communication 107.

The example contact information controller 220 of the illustrated example of FIG. 2 is provided to obtain the contact information from the example data structure 165 stored in the example contact datastore 130. In some examples, the example contact information controller 220 may obtain the contact information of the example sender device 105 associated with the example electronic communication 107 from the example electronic communication receiver 210. In some examples, the example contact information controller 220 compares the contact information associated with the example electronic communication with the contact information stored in the example data structure 165 of the example contact datastore 130. In some examples, the example contact information controller 220 may obtain all of the entries in the example data structure 165 that have the same identifier as the example electronic communication

107. For example, the example electronic communication 107 may be an email which has the identifier "email." In this example, the example contact information controller 220 may obtain all of the entries in the example data structure 165 that have the identifier "email."

In some examples, the example contact information controller 220 may search the entries with the identifier of the example electronic communication 107 for the same value as the electronic communication 107. For example, the electronic communication 107 may have a value "first.last@gmail.com." In this example, the example contact information controller 220 may search the entries selected with the same identifier to see if one of the entries has the value "first.last@gmail.com." In some examples, if an entry in the example data structure 165 has both the identifier and value of the example electronic communication 107, then the contact information controller 220 provides the entry in the example data structure 165 to the example contact identifier 230. In some examples, if the example contact information controller 220 does not find an entry in the example data structure 165 that has both the identifier and value of the example electronic communication 107, then the contact information controller 220 does not provide the example contact identifier 230 with an entry. In some examples, the example contact information controller 220 may provide the example contact identifier 230 with an error code to signify that a matching entry was not found in the example data structure 165.

The example contact identifier 230 of the illustrated example of FIG. 2 is provided to determine if the user has replied to the example sender device 105 (the source of the electronic communication) previously. In some examples, the example contact identifier 230 receives the output of the example contact information controller 220. In some examples, the example contact identifier 230 determines that the user has replied to the sender of the example electronic communication 107 previously when the example contact identifier 230 receives an entry of the example data structure 165 from the example contact information controller 220. In some examples, the example contact identifier 230 determines that the user has not replied to the sender of the example electronic communication 107 previously when the example contact identifier 230 does not receive an entry of the example data structure 165 from the example contact information controller 220. In some examples, the example contact identifier 230 determines that the user has not replied to the sender of the example electronic communication 107 previously when the example contact identifier 230 receives an error code from the example contact information controller 220.

Figure 3:
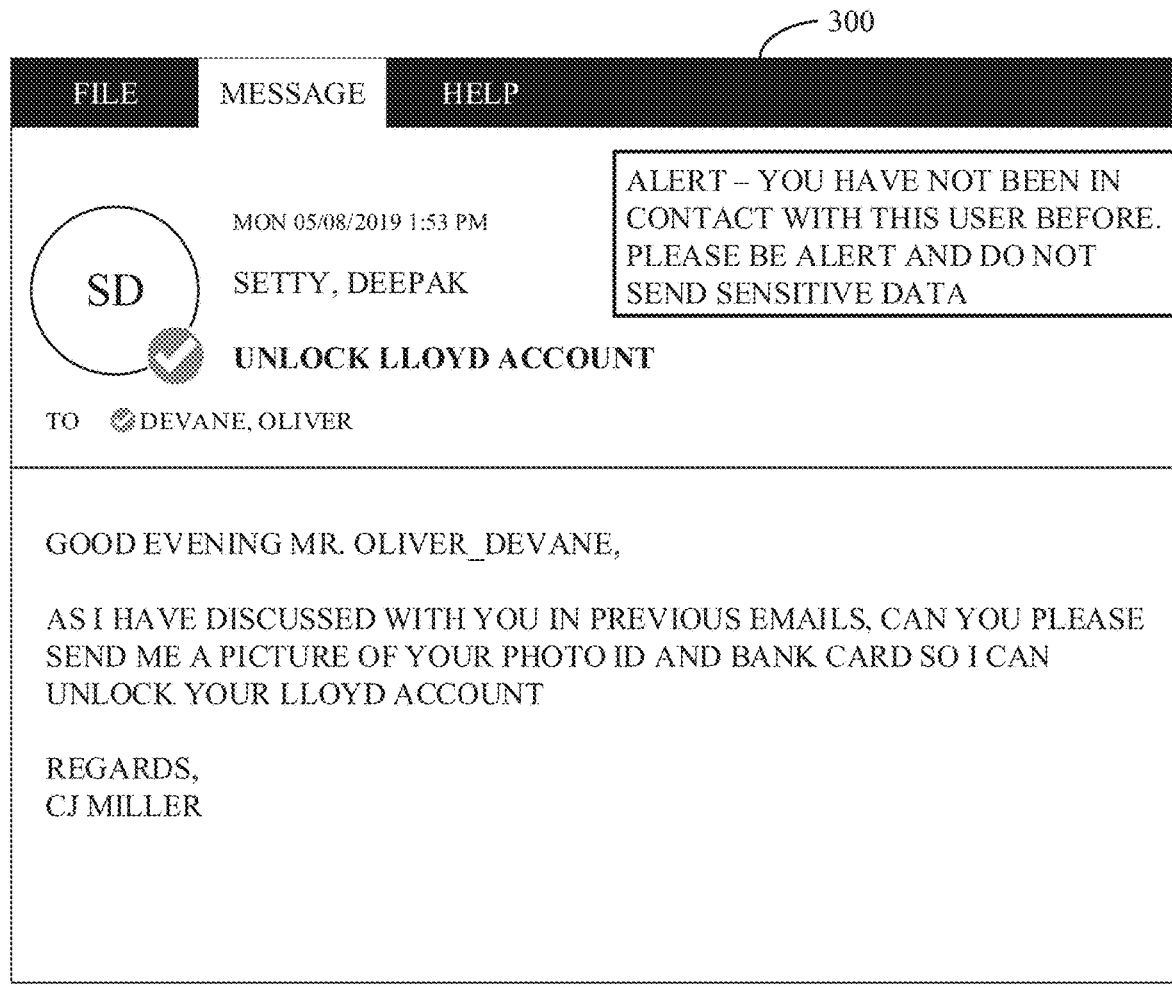
FIG. 3 is an example representation of an electronic communication including an alert in accordance with teachings disclosed herein.

The example contact identifier 230 is also provided to alert the user that the sender of the example electronic communication 107 is unknown. In some examples, the example contact identifier 230 generates an alert for the user when the example contact identifier 230 determines that the user has not replied to the sender of the example electronic communication 107 previously. In some examples, the alert may contain information to notify a user that the example electronic communication 107 is from a sender that the user has not communicated with before. In some examples, the alert may contain warnings about any attachment file(s) or URLs included in the example electronic communication 107. In some examples, the alert may be visual and/or auditory. For example, the alert may be a display window on the application that the example electronic communication 107 was received on. In some examples, the alert may be an auditory signal that alerts the user that the example electronic communication 107 may not be from a trusted source. However, other types of alerts may additionally and/or alternatively be used to notify the user that the sender of the example electronic communication 107 is unknown. An example of an alert generated by the example contact identifier 230 is illustrated in FIG. 3, which is described in further detail below.

The example malicious content scanner 240 of the illustrated example of FIG. 2 is provided to determine if the example electronic communication 107 needs extra scanning. In some examples, the example malicious content scanner 240 determines if the example electronic communication 107 includes a URL and/or an attachment. In some examples, if the example malicious content scanner 240 determines that the example electronic communication 107 does contain a URL and/or an attachment, the example malicious content scanner 240 scans the URL and/or attachment with anti-virus software before the URL and/or attachment are executed. In some examples, after scanning the URL with anti-virus software, the example malicious content scanner 240 determines if the URL is malicious. In some examples, the URL is malicious if the anti-virus software flags any contents that may be considered harmful to the example user device 115. In some examples, the example malicious content scanner 240 deletes the example electronic communication 107 and the file(s) associated with the example electronic communication 107 from the example user device 115 if the example malicious content scanner 240 determines the URL is malicious.

In some examples, after scanning the attachment with anti-virus software, the example malicious content scanner 240 determines if the process in the attachment is executed on the example user device 115. In some examples, if the example malicious content scanner 240 determines that the process in the attachment is executed, the example malicious content scanner 240 monitors the process from the attachment for malicious activity as it executes on the example user device 115. In some examples, the example malicious content scanner 240 determines if the attachment file or the process in the attachment is malicious. In some examples, the attachment file or the process in the attachment is malicious if the anti-virus software flags any contents that may be considered harmful to the example user device 115 or if the example process executes any harmful programs on the example user device 115. The example malicious content scanner 240 monitors the process for malicious activity as it executed on the example user device 115. In some examples, the example malicious content scanner 240 deletes the example electronic communication 107 and the attachment file(s) in the example electronic communication 107 from the example user device 115 if the example malicious content scanner 240 determines the attachment and/or the program of the attachment is malicious.

The example user action determiner 250 of the illustrated example of FIG. 2 is provided to determine if the user responded to the example electronic communication 107 after receiving the alert. In some examples, the example user action determiner 250 may monitor for communication history that indicates an electronic communication is sent from the example user device 115 to determine if the user responded to the example electronic communication 107. In some examples, the example user action determiner 250 stores the contact information of the sender of the example electronic communication 107 in the example contact datastore 130 when the example user action determiner 250 determines that the user responded to the example electronic communication 107 after receiving the alert.

FIG. 3 is an example representation of an electronic communication that includes an alert that may be an output from the example trusted communication identifier 155 of FIG. 2. The example electronic communication 300 of the illustrated example of FIG. 2 is representative of an example email electronic communication that may be received in an email application on the example user device 115. In some examples, the contact information of the example electronic communication 300 has been determined to not be included in the example contact datastore 130 by the example trusted communication identifier 155 of the example of FIG. 2. In some examples, the example contact identifier 230 generates an alert to notify a user of an electronic communication whose contact information was not found among the known contacts in the example contact datastore 130. The example electronic communication 300 illustrates an example of an alert generated by the example contact identifier 230. The example electronic communication 300 includes a visual alert displayed to the user to notify the user that they have not been in contact with the sender device of the example electronic communication 300. However, other visual alerts to notify the user may additionally and or alternatively be used.

While an example manner of implementing the electronic communication monitor of FIG. 1 is illustrated in FIGS. 4, 5, 6, and 7, one or more of the elements, processes and/or devices illustrated in FIGS. 4, 5, 6, and 7 may be combined, divided, re-arranged, omitted, eliminated and/or implemented in any other way. Further, the example contact information initializer 150, the example trusted communication identifier 155, the example electronic communication receiver 210, the example contact information controller 220, the example contact identifier 230, the example malicious content scanner 240, the example user action determiner 250, the example new contact monitor 160 and/or, more generally, the example electronic communication monitor 140 of FIG. 1 may be implemented by hardware, software, firmware and/or any combination of hardware, software and/or firmware. Thus, for example, any of the example contact information initializer 150, the example trusted communication identifier 155, the example electronic communication receiver 210, the example contact information controller 220, the example contact identifier 230, the example malicious content scanner 240, the example user action determiner 250, the example new contact monitor 160 and/or, more generally, the example electronic communication monitor 140 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example contact information initializer 150, the example trusted communication identifier 155, the example electronic communication receiver 210, the example contact information controller 220, the example contact identifier 230, the example malicious content scanner 240, the example user action determiner 250, and/or the example new contact monitor 160 is/are hereby expressly defined to include a non-transitory computer readable storage device or storage disk such as a memory, a digital versatile disk (DVD), a compact disk (CD), a Blu-ray disk, etc. including the software and/or firmware. Further still, the example electronic communication monitor 140 of FIG. 1 may include one or more elements, processes and/or devices in addition to, or instead of, those illustrated in FIGS. 4, 5, 6, and 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the example electronic communication monitor 140 of FIG. 1 is shown in FIGS. 4, 5, 6, and 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4, 5, 6, and 7, many other methods of implementing the example electronic communication monitor 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, 6, and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
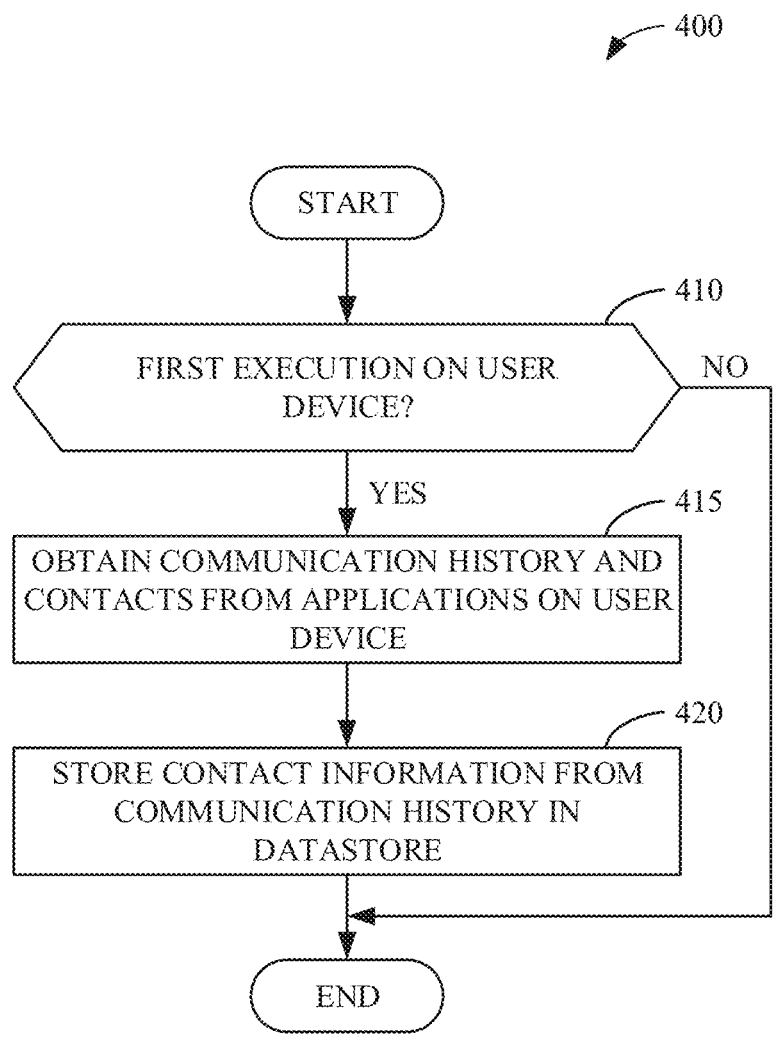
FIG. 4 is a flowchart representative of machine-readable instructions that may be executed to implement an example contact information initializer in the electronic communication monitor of FIG. 1.

FIG. 4 is a flowchart illustrating a process 400 that is representative of machine-readable instructions which may be executed to implement the example contact information initializer 150 in the electronic communication monitor 140 of FIG. 1. In some examples, the machine-readable instructions of process 400 may cause a processor to implement the example contact information initializer 150. The program of FIG. 4 begins execution at block 410 at which the example contact information initializer 150 determines if this is the first execution of the example electronic communication monitor 140 on the example user device 115. At block 415, the example contact information initializer 150 obtains the communication history and contacts from the applications on the user device. In some examples, the example contact information initializer 150 may only obtain the communication history that was utilized in sending electronic communications from the example user device 115.

At block 420, the example contact information initializer 150 stores the contact information from the communication history in the example contact datastore 130. In some examples, the example contact information initializer 150 stores the contact information from the relevant communication history and the contacts in the address book of the application in the example contact datastore 130 using the example network 120. In some examples, the example contact information initializer 150 may store the identifier and value information of the contact information obtained from the applications in the example data structure 165 of FIG. 1. In some examples, the example contact information initializer 150 may identify the identifier information of the contact information based on the application that the communication history and contacts are from. For example, the example contact information initializer 150 may determine the communication history and contacts from an email application have the identifier "email." The example contact information initializer 150 may determine the value information of the contact information based on determining the identified destination for any electronic communications for that contact (e.g., a phone number, an email address, a username, etc.). After block 420 is completed, process 400 then ends.

Figure 5:
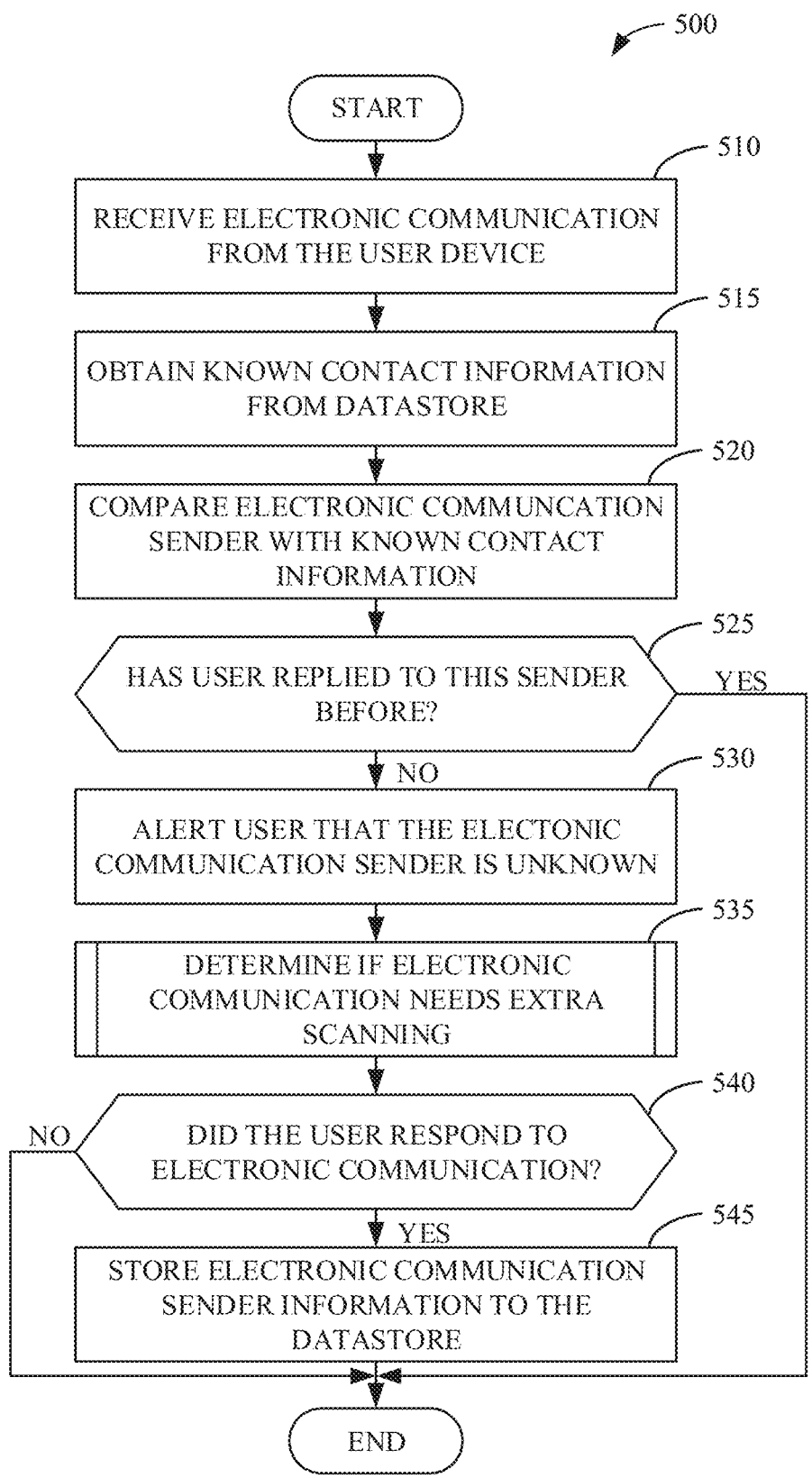
FIG. 5 is a flowchart representative of machine-readable instructions that may be executed to implement the trusted communication identifier of FIG. 2.

FIG. 5 is a flowchart illustrating a process 500 that is representative of machine-readable instructions which may be executed to implement the example trusted communication identifier 155 of FIG. 2. In some examples, the machine-readable instructions of process 500 may cause a processor to implement the example trusted communication identifier 155. The program of FIG. 5 begins execution at block 510 at which the example electronic communication receiver 210 receives the example electronic communication 107 from the example user device 115. In some examples, the example electronic communication receiver 210 accesses the example electronic communication 107 as well as the contact information of the example sender device 105 (e.g., source) associated with the example electronic communication 107.

At block 515, the example contact information controller 220 obtains the known contact information from the example contact datastore 130. In some examples, the example contact information controller 220 may obtain the contact information of the example sender device 105 associated with the example electronic communication 107 from the example electronic communication receiver 210. In some examples, the example contact information controller 220 compares the contact information associated with the example electronic communication 107 with the contact information stored in the example data structure 165 of the example contact datastore 130. In some examples, the example contact information controller 220 may obtain all of the entries in the example data structure 165 that have the same identifier as the example electronic communication 107.

At block 520, the example contact information controller 220 compares the electronic communication sender with the known contact information. In some examples, the example contact information controller 220 compares the contact information of the sender of the example electronic communication 107 with the known contact information from the example contact datastore 130. In some examples, the example contact information controller 220 may search the entries with the identifier of the example electronic communication 107 for the same value as the electronic communication 107. For example, the electronic communication 107 may have a value "firstlast@gmail.com." In this example, the example contact information controller 220 may search the entries selected with the same identifier to see if one of the entries has the value "first.last@gmail.com." In some examples, the example contact information controller 220 may provide an error code to signify that the contact information of the example electronic communication 107 was not found in the example data structure 165.

At block 525, the example contact identifier 230 determines if the user has replied to this sender before. In some examples, the example contact identifier 230 may receive the output of the example contact information controller 220. In some examples, the example contact identifier 230 determines that the user has replied to the sender of the example electronic communication 107 previously when the example contact identifier 230 receives contact information from the example data structure 165 from the example contact information controller 220 that matches the contact information of the example electronic communication 107. If the example contact identifier 230 determines that the user has replied to this sender before, the example process 500 then ends.

In some examples, the example contact identifier 230 determines that the user has not replied to the sender of the example electronic communication 107 previously when the example contact identifier 230 does not receive contact information from the example data structure 165 from the example contact information controller 220 that matches the contact information of the example electronic communication 107. In some examples, the example contact identifier 230 determines that the user has not replied to the sender of the example electronic communication 107 previously when the example contact identifier 230 receives an error code from the example contact information controller 220. If the example contact identifier 230 determines that the user has not replied to this sender before, the example process 500 continues to block 530 at which the user is alerted that the electronic communication sender is unknown.

At block 530, the example contact identifier 230 alerts the user that the electronic communication sender is unknown. In some examples, the example contact identifier 230 generates an alert for the user when the example contact identifier 230 determines that the user has not replied to the sender of the example electronic communication 107 previously. In some examples, the alert may contain information to notify a user that the example electronic communication 107 is from a sender that the user has not communicated with before. In some examples, the alert may contain a warning to the user that there are attachment file(s) and/or URLs included in the example electronic communication 107. In some examples, the alert may be visual and/or auditory.

At block 535, the example malicious content scanner 240 determines if the electronic communication needs extra scanning. In some examples, the example malicious content scanner 240 determines if the example electronic communication 107 contains any URL's or attachments that may need extra scanning to determine if the example electronic communication 107 is trusted. As described in further detail below, the example flowchart 535 of FIG. 6 represents example instructions that may be implemented to perform the extra scanning.

At block 540, the example user action determiner 250 determines if the user responded to the electronic communication. In some examples, the example user action determiner 250 may monitor for communication history that indicates an electronic communication is sent from the example user device 115 to determine if the user responded to the example electronic communication 107. If the example user action determiner 250 determines that the user did respond to the example electronic communication 107, the example process 500 continues to block 545 at which the electronic communication sender information is stored. If the example user action determiner 250 determines that the user did not respond to the example electronic communication 107, the example process 500 then ends.

At block 545, the example user action determiner 250 stores the electronic communication sender information to the example contact datastore 130. In some examples, the example user action determiner 250 stores the contact information of the sender of the example electronic communication 107 in the example contact datastore 130 when the example user action determiner 250 determines that the user responded to the example electronic communication 107 after receiving the alert. After block 545 is completed, process 500 then ends.

Figure 6:
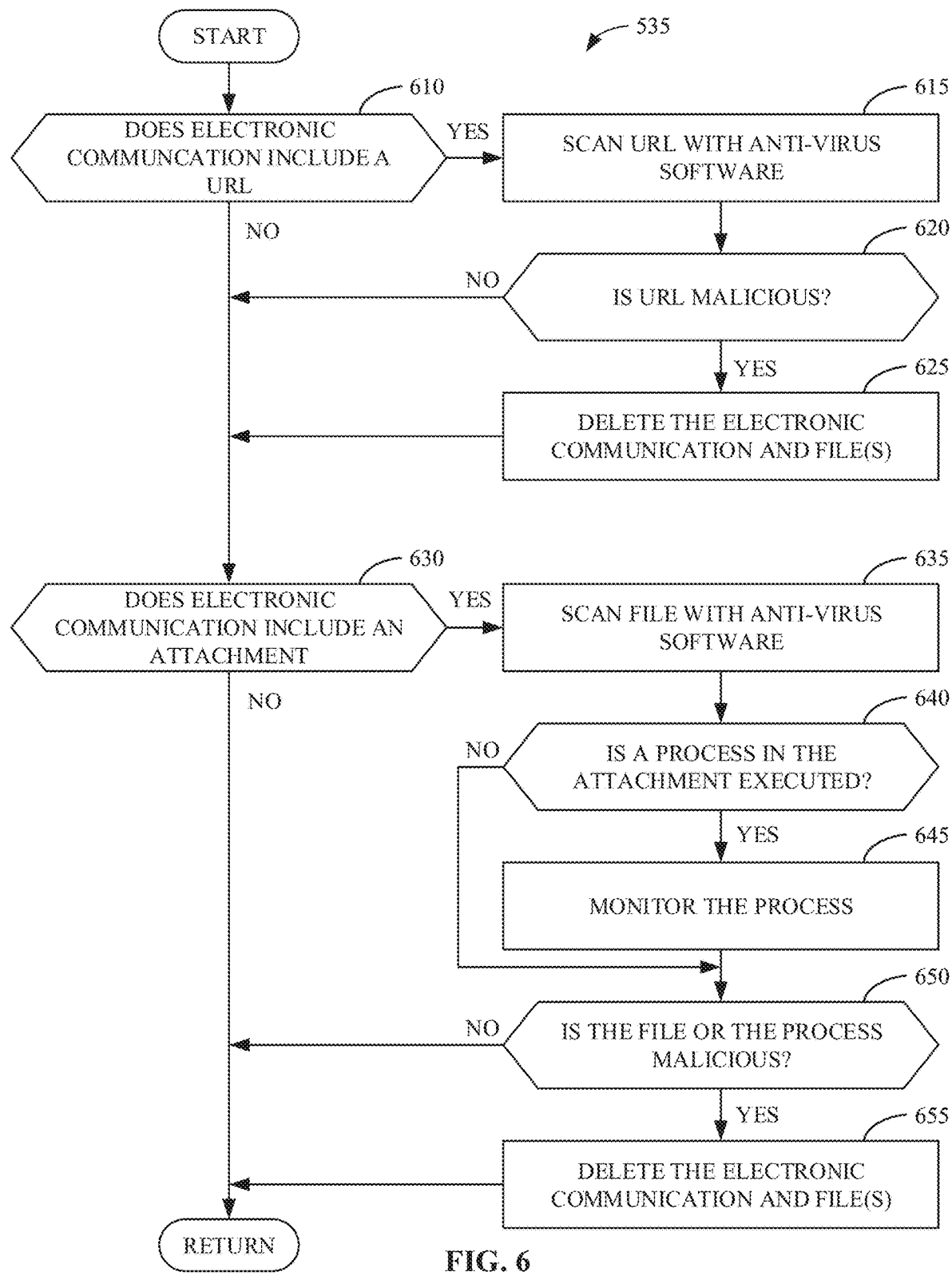
FIG. 6 is a flowchart representative of machine-readable instructions that may be executed to implement an example malicious content scanner in the trusted communication identifier of FIG. 2.

FIG. 6 is a flowchart illustrating the process 535 of FIG. 5 that is representative of machine-readable instructions which may be executed to implement the example malicious content scanner 240 in the trusted communication identifier 155 of FIG. 2. The program 535 of FIG. 6 begins execution at block 610 at which the example malicious content scanner 240 determines if the electronic communication 107 includes a URL. If the example malicious content scanner 240 determines that the example electronic communication 107 does include a URL, process 535 continues to block 615 at which the URL is scanned with anti-virus software. If the example malicious content scanner 240 determines that the example electronic communication 107 does not include a URL, process 535 continues to block 630 at which the example electronic communication 107 is checked for any attachments.

At block 615, the example malicious content scanner 240 scans the URL with anti-virus software. At block 620, the example malicious content scanner 240 determines if the URL is malicious. In some examples, the URL is malicious if the anti-virus software flags any contents that may be considered harmful to the example user device 115. If the example malicious content scanner 240 determines that the URL is malicious, process 535 continues to block 625 at which the example electronic communication 107 and the file(s) are deleted. If the example malicious content scanner 240 determines that the URL is not malicious, process 535 continues to block 630 at which the example electronic communication 107 is checked for any attachments. At block 625, the example malicious content scanner 240 deletes the example electronic communication 107 and the file(s) associated with the example electronic communication 107 from the example user device 115.

At block 630, the example malicious content scanner 240 determines if the example electronic communication 107 includes an attachment. If the example malicious content scanner 240 determines that the electronic communication 107 does include an attachment, process 535 continues to block 635 at which the file is scanned with anti-virus software. If the example malicious content scanner 240 determines that the electronic communication 107 does not include an attachment, process 535 ends and returns to process 400 of FIG. 4.

At block 635, the example malicious content scanner 240 scans the attachment file with anti-virus software. At block 640, the example malicious content scanner 240 determines if the process in the attachment is executed on the example user device 115. If the example malicious content scanner 240 determines that the process in the attachment is executed on the example user device 115, process 535 continues to block 645 at which the process is monitored. If the example malicious content scanner 240 determines that the process in the attachment is not executed on the user device, process 535 continues to block 650 at which it is determined if the file or process is malicious.

At block 645, the example malicious content scanner 240 monitors the process from the attachment as it executes on the user device. At block 650, the example malicious content scanner 240 determines if the attachment file or the process in the attachment is malicious. In some examples, the attachment file or the process in the attachment is malicious if the anti-virus software flags any contents that may be considered harmful to the example user device 115 and/or if the example process executes any harmful programs on the example user device 115 as the process is monitored by the example malicious content scanner 240. If the example malicious content scanner 240 determines that the attached file or the process in the attachment is malicious, process 535 continues to block 655 at which the electronic communication and file(s) are deleted. If the example malicious content scanner 240 determines that the attachment file or the process in the attachment is not malicious, process 535 ends and returns to process 400 of FIG. 4.

At block 655, the example malicious content scanner 240 deletes the example electronic communication 107 and the attachment file(s) in the example electronic communication 107 from the example user device 115. After block 655 completes, the example process 535 completes and returns to process 400 of FIG. 4.

Figure 7:
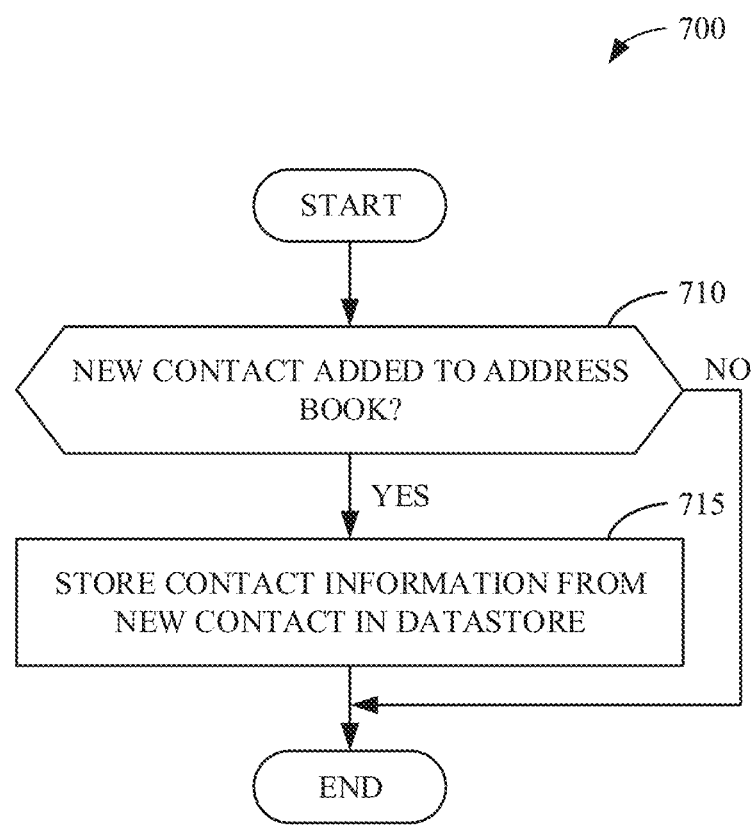
FIG. 7 is a flowchart representative of machine-readable instructions that may be executed to implement the example new contact monitor in the electronic communication monitor of FIG. 1.

FIG. 7 is a flowchart illustrating a process 700 that is representative of machine-readable instructions which may be executed to implement the example new contact monitor 160 in the electronic communication monitor 140 of FIG. 1. In some examples, the machine-readable instructions of process 700 may cause a processor to implement the example new contact monitor 160. The program of FIG. 7 begins execution at block 710 at which the example new contact monitor 160 determines if a new contact has been added to the address book on an application on the user device. If the example new contact monitor 160 determines that a new contact has been added to the address book, process 700 continues to block 715 at which the new contact information is stored in the example contact datastore 130. If the example new contact monitor 160 determines that the new contact has not been added to the address book of the application on the example user device 115, process 700 ends.

At block 715, the example new contact monitor 160 stores the contact information of the new contact in the example contact datastore 130. In some examples, the example new contact monitor 160 may store the identifier and value information of the contact information obtained from the new contact added to the application on the example user device 115. In some examples, the example new contact monitor 160 may identify the identifier information of the contact information based on the application that the new contact was added to. For example, the example new contact monitor 160 may determine the new contact added to an email application has the identifier "email." The example new contact monitor 160 may determine the value information of the new contact information based on determining the identified destination for any electronic communications for that new contact (e.g., a phone number, an email address, a username, etc.) that was input into the address book of the application. In some examples, the example new contact monitor 160 stores the example identifier and value information for the new contact added to the application of the example user device 115 in the example data structure 165 of the example contact datastore 130. After block 715 completes, process 700 ends.

Figure 8:
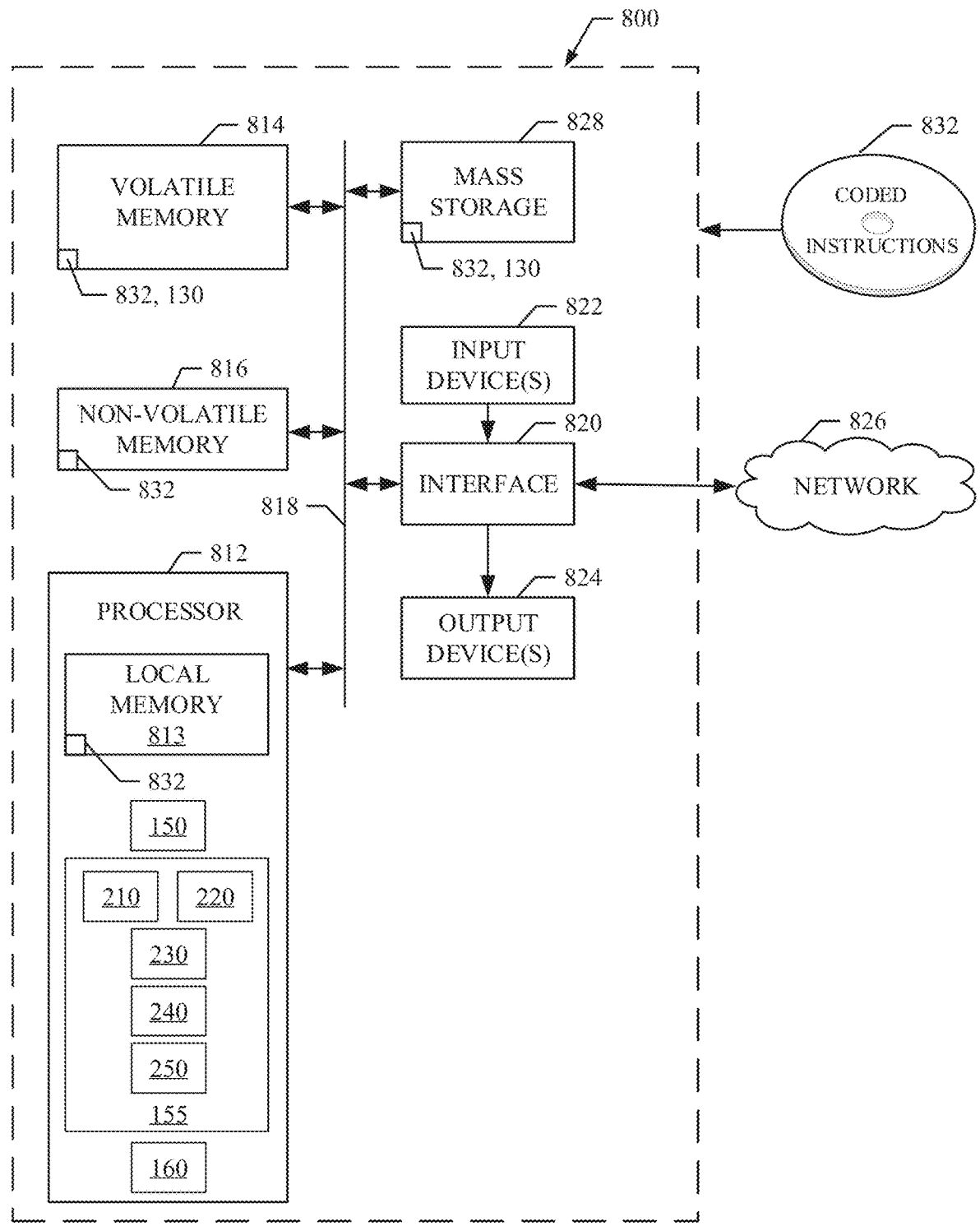
FIG. 8 is a block diagram of an example processing platform structured to execute the instructions of FIGS. 4, 5, 6, and 7 to implement the example electronic communication monitor of FIG. 1.

FIG. 8 is a block diagram of an example processor platform 800 structured to execute the instructions of FIGS. 4, 5, 6, and 7 to implement the example electronic communication monitor 140 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example contact information initializer 150, the example trusted communication identifier 155, the example electronic communication receiver 210, the example contact information controller 220, the example contact identifier 230, the example malicious content scanner 240, the example user action determiner 250, and the example new contact monitor 160.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a keyboard, a button, a mouse, a touchscreen, a track-pad, and/or a trackball.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. The example contact datastore 130 may be implemented by one or more mass storage devices 828 and/or by the volatile memory 814 or non-volatile memory 816.

The machine executable instructions 832 of FIGS. 4, 5, 6, and 7 may be stored in the mass storage device 828, in the volatile memory 814, in the non-volatile memory 816, and/or on a removable non-transitory computer readable storage medium such as a CD or DVD.

Figure 9:
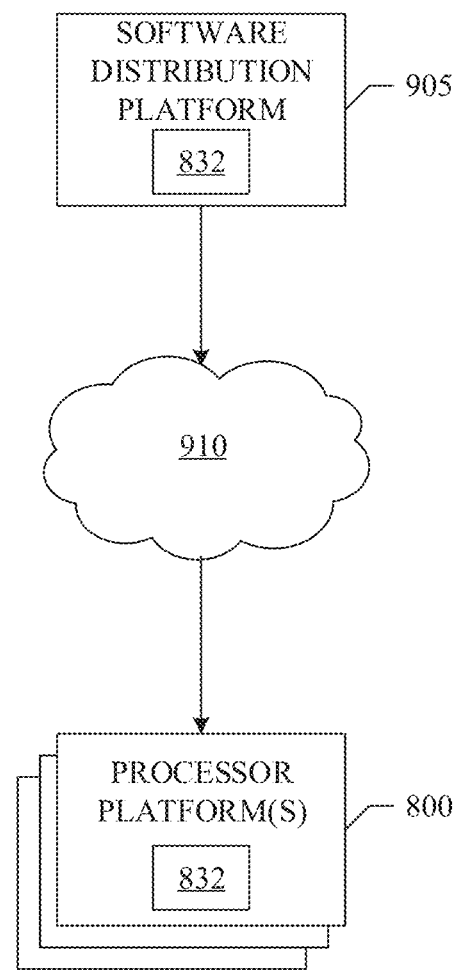
FIG. 9 is a block diagram of an example software distribution platform to distribute software (e.g., software corresponding to the example computer readable instructions of FIGS. 4, 5, 6, and 7) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example computer readable instructions 832 of FIGS. 4, 5, 6, and 7, as described above. The one or more servers of the example software distribution platform 905 are in communication with a network 910, which may correspond to any one or more of the Internet and/or any of the example network 110 and the example network 826 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 832 from the software distribution platform 905. For example, the software, which may correspond to the example computer readable instructions 832 of FIG. 8, may be downloaded to the example processor platform 800, which is to execute the computer readable instructions 832 to implement the example electronic communication monitor 140. In some example, one or more servers of the software distribution platform 905 periodically offer, transmit, and/or force updates to the software (e.g., the example computer readable instructions 832 of FIG. 8) to ensure improvements, patches, updates, etc. are distributed and applied to the software at the end user devices.

From the foregoing, it will be appreciated that example methods, apparatus and articles of manufacture have been disclosed that allow for optimization of identifying suspicious electronic communications received by user devices. The disclosed methods, apparatus and articles of manufacture improve the efficiency of using a computing device by reducing computational requirements of systems that identify suspicious electronic communication. The disclosed examples prevent over-alerting a user of suspicious electronic communications by identifying the suspicious electronic communications based on the communication history of a user device. The disclosed methods, apparatus and articles of manufacture are accordingly directed to one or more improvement(s) in the functioning of a computer.

It is noted that this patent claims priority from Indian Provisional Patent Application Serial Number 202011016631, which was filed on Apr. 17, 2020, and is hereby incorporated by reference in its entirety.

It is noted that this patent claims priority from Indian Provisional Patent Application Serial Number 202011016631, which was filed on Apr. 17, 2020, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to process an electronic communication, the apparatus comprising:
   an electronic communication receiver to receive the electronic communication from a first application;
   a contact information controller to determine whether a sender of the electronic communication is stored within a contact datastore, the contact datastore including first known senders of communications corresponding to the first application and second known senders of communications corresponding to a second application;
   a contact identifier to:
      determine that a communication has not previously been sent from a recipient of the electronic communication to the sender of the electronic communication when the sender is not found in the contact datastore; and
      after determining that the communication has not been previously sent, provide an alert message that the sender of the electronic communication is unknown; and
   a user action determiner to, in response to a determination that a response to the electronic communication has been sent, store information corresponding to the sender of the electronic communication in the contact datastore.

2. The apparatus of claim 1, further including a contact information initializer to:
   obtain at least one of a communication history associated with an identified application on a user device or contacts associated with the identified application on the user device; and
   store information associated with the at least one of the communication history or the contacts, wherein the at least one of the communication history or the contacts were utilized to send one or more communications from the user device.

3. The apparatus of claim 2, wherein the identified application on the user device is the first application on the user device, and wherein the communication history is associated with at least the second application on the user device.

4. The apparatus of claim 1, further including a new contact monitor to:
   determine if a new contact is added to contacts associated with an application; and
   after determining the new contact is added, store contact information associated with the new contact in the contact datastore.

5. The apparatus of claim 1, further including a malicious content scanner to determine if the electronic communication includes a uniform resource locator (URL) or an attachment file.

6. The apparatus of claim 5, further including the malicious content scanner to determine if the URL included in the electronic communication is malicious.

7. The apparatus of claim 5, further including the malicious content scanner to determine if the attachment file included in the electronic communication is malicious.

8. At least one non-transitory computer readable storage medium comprising instructions that, when executed, cause at least one processor to at least:
   receive an electronic communication from a first application;
   determine whether a sender of the electronic communication is stored within a contact datastore, the contact datastore including first known senders of communications corresponding to the first application and second known senders of communications corresponding to a second application;
   determine that a communication has not previously been sent from a recipient of the electronic communication to the sender of the electronic communication when the sender from the electronic communication is not found in the contact datastore;
   after determining that the communication has not been previously sent, provide an alert message that the sender of the electronic communication is unknown; and
   after determining that a response to the electronic communication has been sent, store information corresponding to the sender of the electronic communication in the contact datastore.

9. The at least one non-transitory computer readable storage medium of claim 8, wherein the instructions, when executed, cause the at least one processor to:
   obtain at least one of a communication history associated with an identified application on a user device or contacts associated with the identified application on the user device; and
   store, in the contact datastore, information associated with the at least one of the communication history or the contacts, wherein the at least one of the communication history or the contacts were utilized to send one or more communications from the user device.

10. The at least one non-transitory computer readable storage medium of claim 9, wherein the identified application on the user device is the first application on the user device, and wherein the communication history is associated with at least the second application on the user device.

11. The at least one non-transitory computer readable storage medium of claim 8, wherein the contact datastore is accessible across a plurality of user devices.

12. The at least one non-transitory computer readable storage medium of claim 8, wherein the instructions, when executed, cause the at least one processor to:
   determine if a new contact is added to contacts associated with an application; and
   after determining the new contact is added, store contact information associated with the new contact in the contact datastore.

13. The at least one non-transitory computer readable storage medium of claim 8, wherein the instructions, when executed, cause the at least one processor to determine if the electronic communication includes a uniform resource locator (URL) or an attachment file.

14. The at least one non-transitory computer readable storage medium of claim 13, wherein the instructions, when executed, cause the at least one processor to determine if the URL included in the electronic communication is malicious.

15. The at least one non-transitory computer readable storage medium of claim 13, wherein the instructions, when executed, cause the at least one processor to determine if the attachment file included in the electronic communication is malicious.

16. A method to process an electronic communication, the method comprising:
- receiving the electronic communication from a first application;
- determining whether a sender of the electronic communication is stored within a contact datastore, the contact datastore including first known senders of communications corresponding to the first application and second known senders of communications corresponding to a second application;
- determining that a communication has not previously been sent from a recipient of the electronic communication to the sender of the electronic communication when the sender from the electronic communication is not found in the contact datastore;
- after determining that the communication has not been previously sent, providing an alert message that the sender of the electronic communication is unknown; and
- after determining that a response to the electronic communication has been sent, storing information corresponding to the sender of the electronic communication in the contact datastore.

17. The method of claim 16, further including:
- obtaining at least one of a communication history associated with an identified application on a user device or contacts associated with the application on the user device; and
- storing, in a datastore, information associated with the at least one of the communication history or the contacts, wherein the at least one of the communication history or the contacts were utilized to send one or more communications from the user device.

18. The method of claim 17, wherein the identified application on the user device is the first application on the user device, and wherein the communication history is associated with at least the second application on the user device.

19. The method of claim 16, wherein the contact datastore is accessible across a plurality of user devices.

20. The method of claim 16, further including:
- determining if a new contact is added to contacts associated with an application; and
- after determining the new contact is added, storing contact information associated with the new contact in the contact datastore.

* * * * *